(12) United States Patent
Pautard

(10) Patent No.: US 10,899,051 B2
(45) Date of Patent: Jan. 26, 2021

(54) METHOD OF FABRICATING A COMPOSITE MATERIAL BLADE HAVING AN INTEGRATED METAL LEADING EDGE FOR A GAS TURBINE AEROENGINE

(71) Applicant: SAFRAN, Paris (FR)

(72) Inventor: Sebastien Pautard, Palaiseau (FR)

(73) Assignee: SAFRAN, Paris (FR)

( * ) Notice: Subject to any disclaimer, the term of this patent is extended or adjusted under 35 U.S.C. 154(b) by 181 days.

(21) Appl. No.: 14/908,321

(22) PCT Filed: Jul. 22, 2014

(86) PCT No.: PCT/FR2014/051893
§ 371 (c)(1),
(2) Date: Jan. 28, 2016

(87) PCT Pub. No.: WO2015/015091
PCT Pub. Date: Feb. 5, 2015

(65) Prior Publication Data
US 2016/0167269 A1 Jun. 16, 2016

(30) Foreign Application Priority Data
Jul. 29, 2013 (FR) ..................................... 13 57485

(51) Int. Cl.
*B29C 45/14* (2006.01)
*F01D 5/28* (2006.01)
(Continued)

(52) U.S. Cl.
CPC .. *B29C 45/14336* (2013.01); *B29C 45/14008* (2013.01); *B29C 70/48* (2013.01);
(Continued)

(58) Field of Classification Search
None
See application file for complete search history.

(56) References Cited

U.S. PATENT DOCUMENTS 3,215,511 A * 11/1965 Chisholm ............... F01D 5/284
428/564
3,844,728 A * 10/1974 Copley ................... F01D 5/147
416/225
(Continued)

FOREIGN PATENT DOCUMENTS

EP 0 813 956 A1 12/1997
EP 1 777 063 A1 4/2007
(Continued)

OTHER PUBLICATIONS

International Search Report dated Jan. 5, 2015 in PCT/FR2014/051893.
(Continued)

*Primary Examiner* — Edmund H Lee
(74) *Attorney, Agent, or Firm* — Oblon, McClelland, Maier & Neustadt, L.L.P.

(57) ABSTRACT

A method of fabricating a blade of composite material having an incorporated metal leading edge for a gas turbine aeroengine, the method including in succession placing a metal strip for making the leading edge of a blade in a cavity of an injection mold for making the blade, closing the injection mold, injecting a thermoplastic resin under pressure into the cavity of the mold so as to shape and overmold the metal strip, compacting the assembly, solidifying the resin by regulating the temperature of the injection mold, and unmolding the resulting blade.

5 Claims, 4 Drawing Sheets

(51) Int. Cl.
  *B29C 70/78* (2006.01)
  *B29C 70/48* (2006.01)
  *F04D 29/32* (2006.01)
  *F01D 5/14* (2006.01)
  *B29L 31/08* (2006.01)
  *B29K 705/00* (2006.01)

(52) U.S. Cl.
  CPC .............. *B29C 70/78* (2013.01); *F01D 5/147* (2013.01); *F01D 5/282* (2013.01); *F01D 5/286* (2013.01); *F04D 29/324* (2013.01); B29C 45/14786 (2013.01); B29K 2705/00 (2013.01); B29L 2031/08 (2013.01); B29L 2031/082 (2013.01); F05D 2220/32 (2013.01); F05D 2230/20 (2013.01); F05D 2230/211 (2013.01); F05D 2240/303 (2013.01); F05D 2300/10 (2013.01); F05D 2300/43 (2013.01); Y02T 50/60 (2013.01)

(56) References Cited

U.S. PATENT DOCUMENTS

| | | | |
|---|---|---|---|
| 5,149,479 A * | 9/1992 | Nakajima | B29C 37/0057 264/163 |
| 5,358,379 A * | 10/1994 | Pepperman | B23P 6/005 415/191 |
| 5,403,161 A * | 4/1995 | Nealon | B29C 44/12 264/46.7 |
| 5,415,817 A * | 5/1995 | Shiao | B29C 45/2669 264/2.2 |
| 5,674,370 A * | 10/1997 | DuPree | C25D 1/00 205/114 |
| 5,676,896 A * | 10/1997 | Izumida | B29C 45/14467 264/132 |
| 5,876,651 A | 3/1999 | Blackburn, Jr. et al. | |
| 5,965,240 A | 10/1999 | Blackburn et al. | |
| 7,744,346 B2 * | 6/2010 | Schreiber | F01D 5/141 416/223 R |
| 2004/0184921 A1 * | 9/2004 | Schreiber | B23P 15/04 416/229 R |
| 2007/0092379 A1 | 4/2007 | Coupe et al. | |
| 2011/0110787 A1 | 5/2011 | Belmonte et al. | |
| 2011/0194941 A1 * | 8/2011 | Parkin | B29C 70/48 416/224 |
| 2013/0101406 A1 * | 4/2013 | Kweder | B29C 70/46 415/200 |
| 2013/0183161 A1 * | 7/2013 | Richtman | F03D 1/0675 416/232 |
| 2016/0312616 A1 * | 10/2016 | Notarianni | B29C 70/48 |

FOREIGN PATENT DOCUMENTS

EP    2 353 830 A2    8/2011
WO    WO 2010/004216 A1    1/2010

OTHER PUBLICATIONS

French Preliminary Search Report dated Apr. 4, 2014 in Patent Application No. 1357485 (with English translation of categories of cited documents).

Prabhas Bhat, et al., "Process analysis of compression resin transfer molding" Composites: Part A, vol. 40, XP002722802, 2009, pp. 431-441.

* cited by examiner

METHOD OF FABRICATING A COMPOSITE MATERIAL BLADE HAVING AN INTEGRATED METAL LEADING EDGE FOR A GAS TURBINE AEROENGINE

BACKGROUND OF THE INVENTION

The present invention relates to the general field of fabricating gas turbine aeroengine blades out of composite material and including a metal leading edge.

The presence of a metal strip on the leading edge of a gas turbine aeroengine blade made of composite material serves to protect the composite airfoil from abrasion/erosion, and in the event of impact against a foreign body. This applies in particular to the fan blades of an aviation turbine engine, which are exposed to ingesting birds, hail, ice, etc.

Numerous methods exist for making a gas turbine engine blade out of composite material. By way of example, mention may be made of the manual laminating/draping method, the method of injection molding a fiber preform, the embroidery method, the thermo-compression method, etc. These methods are based mainly on using a thermosetting (TD) resin or a thermoplastic (TP) resin.

Once the composite material blade has been obtained, it is then necessary to assemble the protective metal strip on its leading edge. For this purpose, the metal strip, which is made by mechanical methods such as stamping, forming, or electroforming for example, is adhesively bonded to the leading edge of the composite material blade. That operation can be performed in a mold used for bonding the metal strip or in a stove used for curing the bead of adhesive that is applied to the strip, where appropriate.

The above-mentioned fabrication methods present numerous drawbacks. In particular, assembling metal strip on the leading edge of the composite material blade is an additional operation that is lengthy and expensive. Furthermore, those methods present numerous preparation operations, thereby correspondingly increasing the duration and the cost of fabricating the blade.

OBJECT AND SUMMARY OF THE INVENTION

The main object of the present invention is thus to propose a method of fabricating a composite material blade having a metal leading edge, which method does not present the above-mentioned drawbacks.

In accordance with the invention, this object is achieved by a method of fabricating a blade of composite material having an incorporated metal leading edge for a gas turbine aeroengine, the method comprising in succession placing a metal strip for making the leading edge of a blade in a cavity of an injection mold for making the blade, closing the injection mold, injecting a thermoplastic resin under pressure into the cavity of the mold so as to shape and overmold the metal strip, compacting the assembly, solidifying the resin by regulating the temperature of the injection mold, and unmolding the resulting blade.

Such a method is remarkable in that the metal leading edge is assembled (by overmolding) on the composite material blade during the process proper of fabricating the blade. This results in a saving in time and fabrication costs.

Furthermore, while the metal strip is being overmolded to make the leading edge of the blade, the effects of the pressure at which the resin is injected and of the contact against the front of the resin material serve to finalize the shaping and the docking of the pressure side and suction side surfaces of the blade. Tolerance for making the metal leading edge prior to overmolding can thus be relatively slack, thereby limiting fabrication costs and reducing rejection rates. Furthermore, the overmolding of the leading edge serves to limit the shrinkage associated with resin anisotropy over the full height of the blade and serves to limit post-injection deformation associated with the resin.

In an "injection molding" implementation, the method may include completely closing the injection mold prior to starting injection of the resin.

In an "injection/compression molding" implementation, the method may include partially closing the injection mold prior to and during injection of the resin. Under such circumstances, the method preferably includes compressing the partially closed injection mold in order to close it completely during the step of injecting the resin.

Preferably, the method includes molding the blade simultaneously with molding at least one platform of the blade. Thus, the resulting blade is integral with its platform(s), thereby avoiding any need to ensure sealing between each platform and the blade. As a result, incorporating one or more blade platforms directly during the process proper of fabricating the blade produces savings in time and in fabrication cost.

The injection step may be performed in a cavity of the mold in which a fiber preform has previously been placed. Alternatively, the injection step may be performed in a cavity of the mold that does not have a fiber preform.

The invention also provides the use of the above-defined method for fabricating a fan blade, an outlet guide vane, an inlet guide vane, or a variable stator vane.

BRIEF DESCRIPTION OF THE DRAWINGS

Other characteristics and advantages of the present invention appear from the following description made with reference to the accompanying drawings, which show implementations having no limiting character. In the figures.

DETAILED DESCRIPTION OF THE INVENTION

Figure 1:
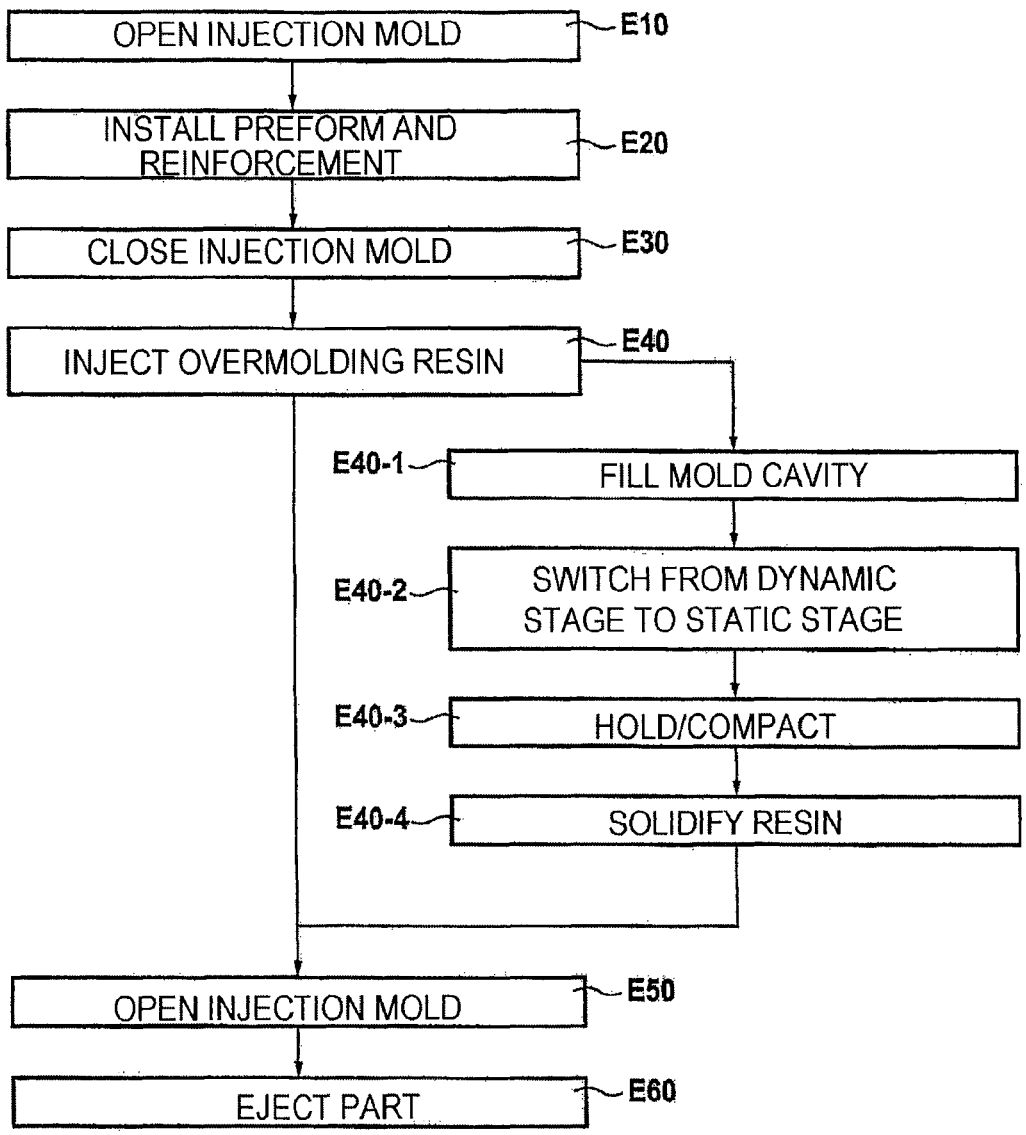
FIG. 1 is a flow chart of the fabrication method in an implementation of the invention.

The invention applies to making blades out of composite material for a gas turbine aeroengine, the blades having metal leading edges.

Non-limiting examples of such blades include in particular fan blades, outlet guide vanes (OGVs), inlet guide vanes (IGVs), variable stator vanes (VSVs), etc.

Such composite material blades can be obtained from fiber reinforcement densified by a matrix. Under such circumstances, they are fabricated from a fiber preform that may be obtained in various ways known to the person skilled in the art. Typically, such preforms may be obtained directly by three-dimensionally weaving yarns (e.g. made of carbon fibers), or by draping two-dimensional fiber fabrics.

Alternatively, these composite material blades may be obtained directly by injecting a thermostatic resin (TP) into a mold, the resin being reinforced by fillers that may be short, long, etc.

The method of the invention for fabricating a composite material blade having a metal leading edge is described below with reference to FIG. 1 and FIGS. 2A and 2B, which show an example injection mold suitable for use in performing the method.

In known manner, such an injection mold 2 includes a recess 4 having a cavity 6 for receiving the blade fiber preform (or for receiving the filled TP resin directly, as the case may be), and also the metal strip that is to constitute the leading edge of the blade. The injection mold also has a core 8 and two recess carrier plates 10. The recess 4 and the core 8 are separated by a parting surface 12. A nozzle 14 serves to fill the cavity 6 of the mold with resin, and regulation channels 16 serve to regulate the temperature of the mold. Finally, ejectors 18 serve to eject both the part and the feed system from the injection mold. Where necessary, in particular for limiting traces of ejection from aerodynamic zones of the airfoil, a gripper hand may be used for ejecting the part from the mold.

In the cavity 6, the injection mold 2 also has a system for positioning and holding a metal strip BA that is to constitute the leading edge of the fiber preform PF of the blade (or merely for overmolding the leading edge with the filled TB resin, as the case may be) on closing the mold.

Figure 2A:
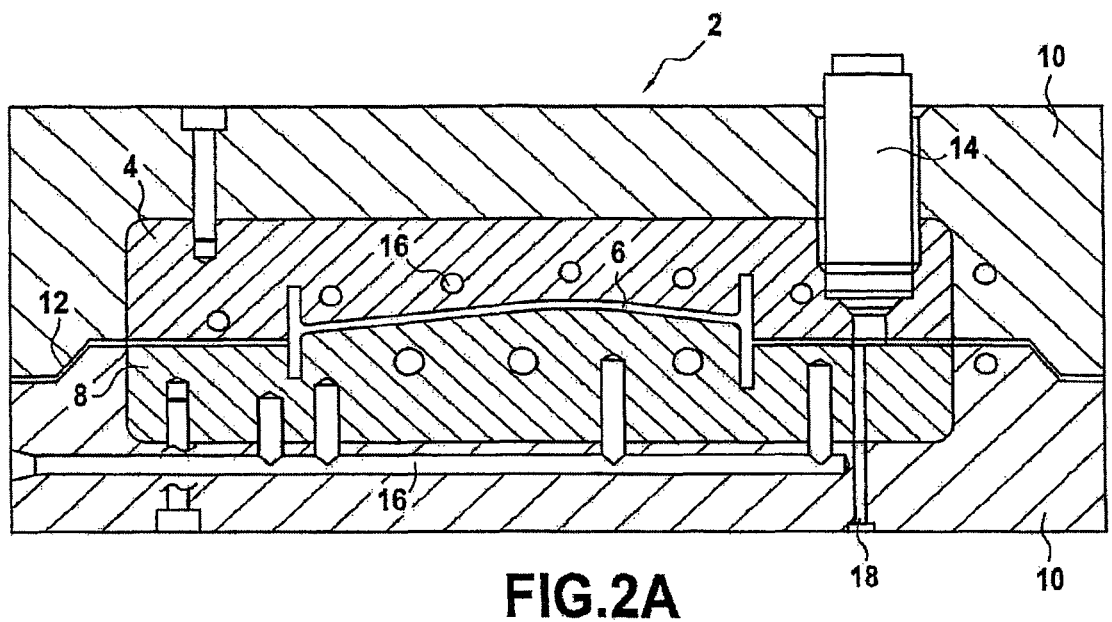
FIGS. 2A and 2B are diagrammatic views of an injection mold, respectively in longitudinal section and in cross-section, suitable for use in performing the method of the invention.
Figure 2B:
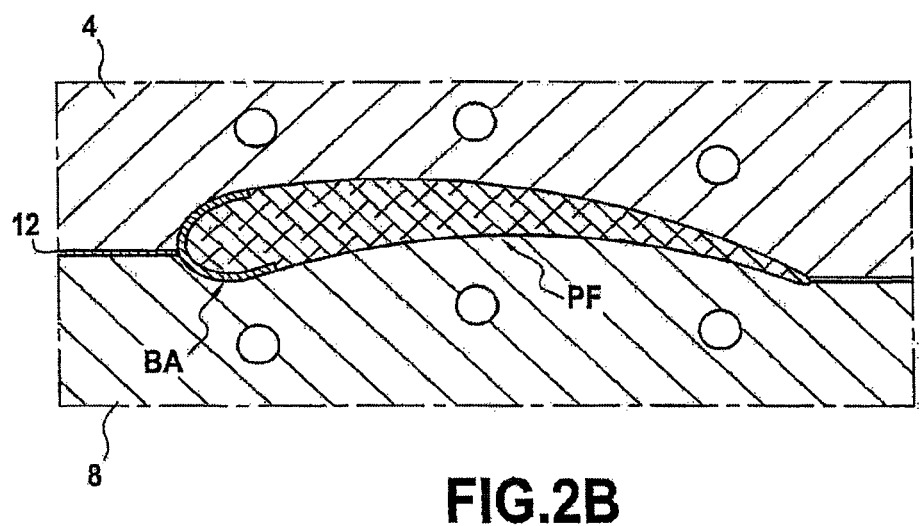

The first step of the invention consists in opening the injection mold (step E10—FIG. 1).

The following step E20 of the method consists in putting into place in the open injection mold 2 the metal strip BA for constituting the leading edge of the blade, and the blade fiber preform PF, if any. It should be observed that the metal foil may be in the form of a strip or it may be solid.

The injection mold may then be closed completely (step E30) and the resin is injected under pressure into the cavity 6 of the mold 2 so as to shape and overmold the metal strip (step E40). When recourse is had to a fiber preform PF for making the blade, the injected resin also serves to impregnate the preform.

When the fiber preform PF is made from carbon fibers, it is possible to use a thermoplastic resin, e.g. a resin based on phenyly polysulfide and/or polyetherimide and/or polyetherketone and/or polyaryletherketones (PAEK). The step of injecting the resin is then performed into the cavity 6 of the mold in which the fiber preform PF has previously been placed.

Likewise, the thermoplastic resin that is used may possibly contain a filler, for example short or long fibers, flakes, beads, etc. of any suitable material (such as glass, carbon, vegetal matter, metal, etc.). Such a filled thermoplastic resin is then injected into the cavity 6 of the mold that does not contain a fiber preform.

More precisely, and in known manner, this injection step E40 comprises a plurality of successive stages, namely a dynamic stage of filling the cavity 6 of the mold with the resin (step E40-1), a switching stage during which the mold cavity is filled (stopping the dynamic stage and moving onto the static stage—step E40-2), a static stage of holding and compacting during which the resin, which is compressible, is "crammed" into the mold cavity and compacting pressure is applied for a determined duration (step E40-3), followed by a stage of solidifying the resin (step E40-4).

The step E40-4 of solidifying the thermoplastic resin is obtained by "cooling", i.e. by means of the temperature of the injection mold being regulated so as to reach the ejection temperature.

After the resin has solidified, the injection mold is opened (step E50) and the resulting blade can be ejected (step E60) by means of the ejectors 18 of the injection mold and possibly by the gripper hand. The blade that is ejected from the injection mold then presents an airfoil of composite material with a metal foil assembled on its leading edge.

Preferably, provision may be made to mold the blade simultaneously with molding at least one blade platform.

When having recourse to a fiber preform for making the blade, this operation may be performed directly by positioning the blade preform and an additional preform for the blade platform in the injection mold prior to closing it. Alternatively, if it is not possible to eject the resulting blade in a single operation, this operation may be performed by overmolding the platform onto the blade. In yet another alternative, this operation may be performed using a bi- or tri-injection mold in which a set of movable cores make the various shapes of the blade (airfoil and platforms).

Figure 3:
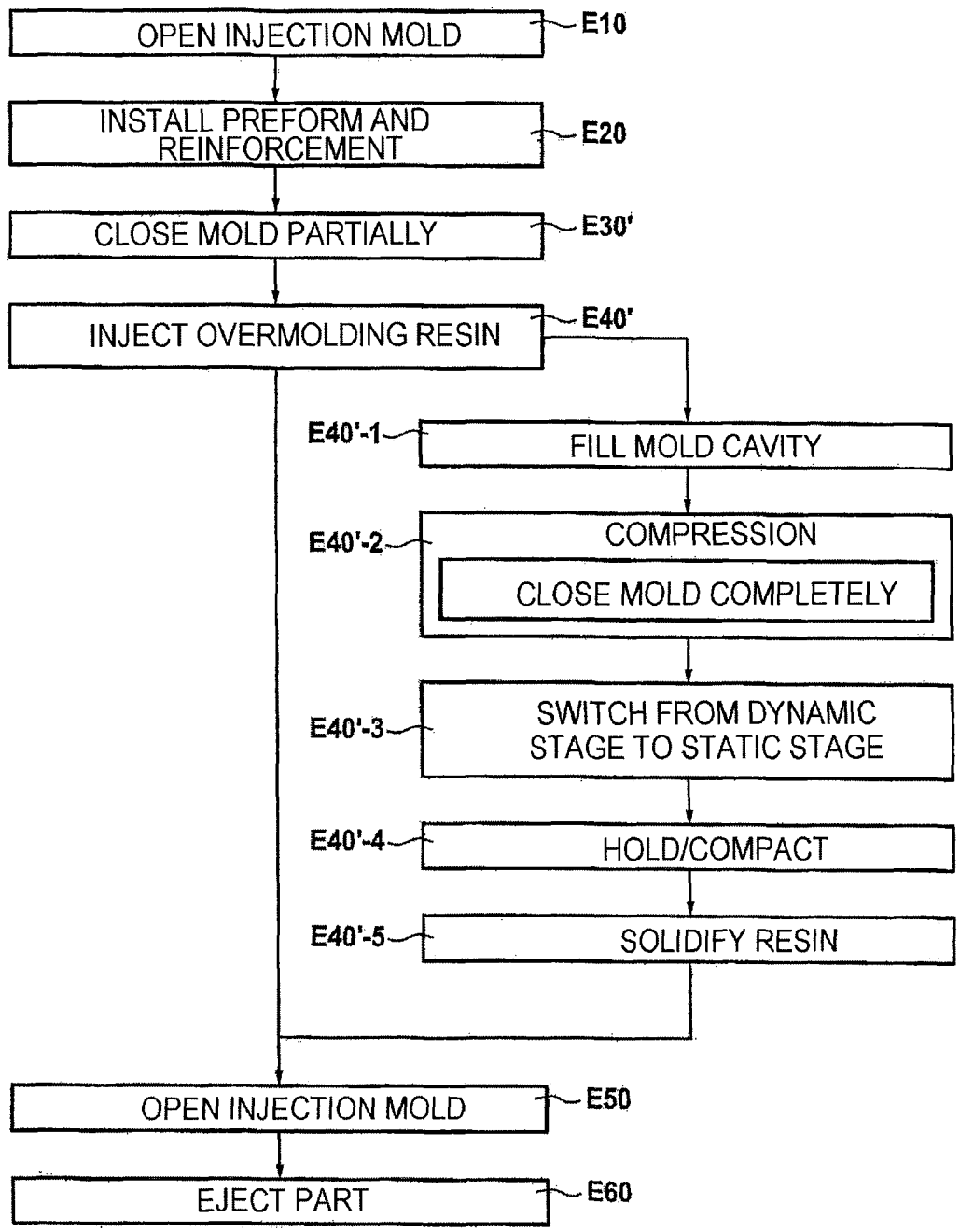
FIGS. 3 and 4 are flow charts of the fabrication method in other implementations of the invention.

FIG. 3 shows another implementation of the method of the invention (injection/compression method).

The first steps E10, E20 of opening the injection mold and placing the metal strip therein to constitute the leading edge of the blade (and the fiber preform, if any) are identical to those of the method described above. Furthermore, the injection mold that is used may be the same as that described with reference to FIGS. 2A and 2B.

The following step E30' consists in closing the injection mold in part. In practice, this is obtained by leaving the parting surface 12 of the injection mold ajar.

The thermoplastic resin is then injected under pressure into the cavity 6 of the mold (step E40'). This step serves in particular to shape and overmold the metal strip. More precisely, the cavity of the injection mold is completely or almost completely filled with the resin (step E40'-1) and compression is applied to the mold in order to close it completely (step E40'-2). It should be observed that the compression may be applied after or during filling of the mold cavity, or indeed during the above-described switching stage.

The switching stage (step E40'-3) and the static holding and compacting stage (step E40'-4) then take place, prior to the stage of solidifying the resin (step E40'-5) as described with reference to the injection method of FIG. 1. After the resin has solidified, the injection mold is opened (step E50) and the resulting blade can be unmolded (step E60).

It should be observed that the compression and switching steps (E40'-2, E40'-3) may be performed in the opposite order or almost simultaneously depending on the topology of the part to be fabricated, on the resin used, and on the resin feed system.

It should also be observed that the compression step E40'-2 serves to finalize the shaping of the metal strip of the leading edge in the cavity of the injection mold and to dock it against the aerodynamic surfaces of the blade. It also makes it possible to obtain twisted shapes for the blade that is to be fabricated.

Figure 4:
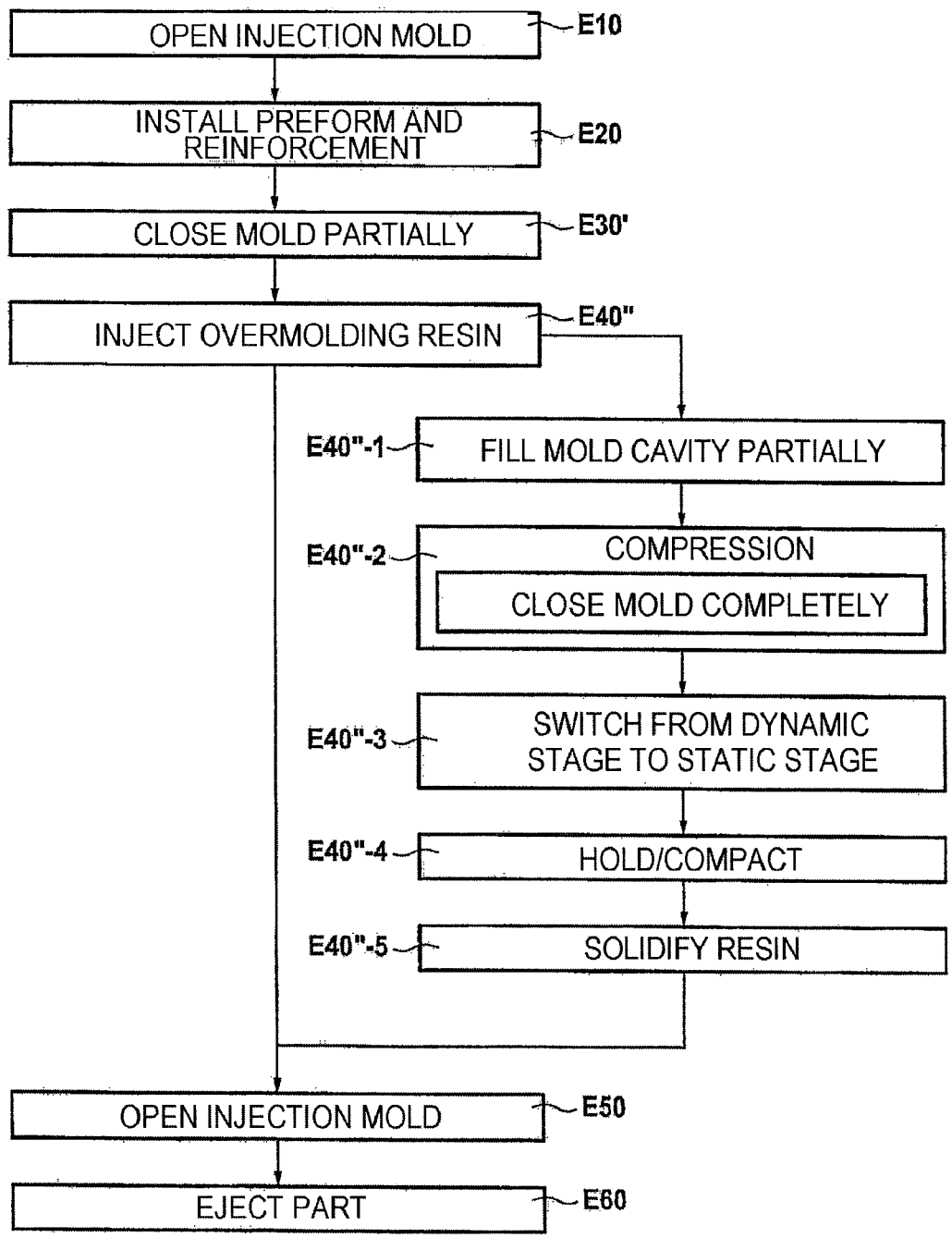

FIG. 4 shows a variant of the injection/compression method of the invention.

The steps of opening the injection mold (E10), putting the metal strip and the fiber preform, if any, into the mold (E20) and of partially closing the mold (E30') are similar to those described above.

During the following step of injecting the thermoplastic resin (E40"), the cavity of the injection mold is filled only partially (to about 85% to 98%—step E40"-1) prior to the compression step for obtaining complete closure of the injection mold (step E40"-2). In addition, the filling of the cavity of the injection mold with resin is finished off, either during the compression stage (E40"-2), or simultaneously with the injection and compression stages E40", E40"-1, and E40"-2.

Thereafter, the switching stage (step E40"-3), the static holding and compacting stage (step E40"-4), and the stage of solidifying the resin (step E40"-5) take place in succession. After the resin has solidified, the injection mold is opened (step E50) and the resulting blade can be unmolded (step E60).

The invention claimed is:

1. A method of fabricating a blade of composite material having an incorporated metal leading edge for a gas turbine aeroengine, the method comprising in succession:
   placing a metal strip for making the leading edge of a blade in a cavity of an injection mold for making the blade;
   partially closing the injection mold including the metal strip;
   injecting a filled thermoplastic resin containing a filler under pressure into the cavity of the partially closed injection mold so as to shape and overmold the metal strip;
   compressing the partially closed injection mold in order to completely close the injection mold during the injecting of the resin so as to form an assembly;
   compacting the assembly including the resin and the metal strip;
   solidifying the resin by regulating the temperature of the injection mold so as to form a resulting blade; and
   unmolding the resulting blade,
   wherein the injecting is performed in a mold cavity being free of a fiber preform such that the mold cavity contains only the metal strip, and
   wherein in the resulting blade, the metal strip is overmolded on the composite material blade such that the resin covers an outer surface of the metal strip, and the resin presents a final shape of the resulting blade on pressure side and suction side surfaces of the resulting blade at a leading edge portion of the resulting blade.

2. A method according to claim 1, further comprising molding the blade simultaneously with molding at least one platform of the blade.

3. The use of the method according to claim 1 for fabricating a fan blade, an outlet guide vane, an inlet guide vane, or a variable stator vane.

4. A method according to claim 1, wherein the injection mold is completely filled with resin prior to the compressing.

5. A method according to claim 1, wherein the injection mold is partially filled with resin prior to the compressing.

* * * * *